United States Patent [19]

Halstrick

[11] 4,342,397

[45] Aug. 3, 1982

[54] FASTENINGS FOR STORAGE RACKS

[76] Inventor: Robert T. Halstrick, 107 Prospect Ave., Langhorne, Pa. 19047

[21] Appl. No.: 185,224

[22] Filed: Sep. 8, 1980

[51] Int. Cl.³ .............................................. A47F 5/00
[52] U.S. Cl. ................................... 211/191; 211/182; 403/187; 403/231
[58] Field of Search ............... 211/182, 192, 189, 191, 211/187, 208; 403/187, 405, 408, 217, 230, 231; 108/111; 248/243

[56] References Cited

U.S. PATENT DOCUMENTS

| | | | |
|---|---|---|---|
| 3,009,582 | 11/1961 | Degener | 211/191 |
| 3,490,604 | 12/1970 | Klein | 211/191 X |
| 3,788,490 | 1/1974 | Featherman | 248/243 X |
| 4,053,245 | 10/1977 | Wright | 403/188 |
| 4,064,996 | 12/1977 | Shillum | 211/191 |
| 4,069,638 | 1/1978 | Hasselqvist et al. | 52/726 |
| 4,146,140 | 3/1979 | Suter et al. | 211/208 X |
| 4,154,419 | 5/1979 | Breidenbach | 211/192 X |

FOREIGN PATENT DOCUMENTS 2801774  4/1979  Fed. Rep. of Germany ...... 248/243

*Primary Examiner*—Roy D. Frazier
*Assistant Examiner*—Robert W. Gibson, Jr.
*Attorney, Agent, or Firm*—Zachary T. Wobensmith, 2nd; Zachary T. Wobensmith, III

[57] ABSTRACT

Fastenings for storage racks having upright columns or posts connected in pairs with diagonal bracing are disclosed and which include gussets or locking plates for locked engagement with vertical portions of the posts and with horizontal crossbeams to connect pairs of connected posts at selected levels.

8 Claims, 5 Drawing Figures

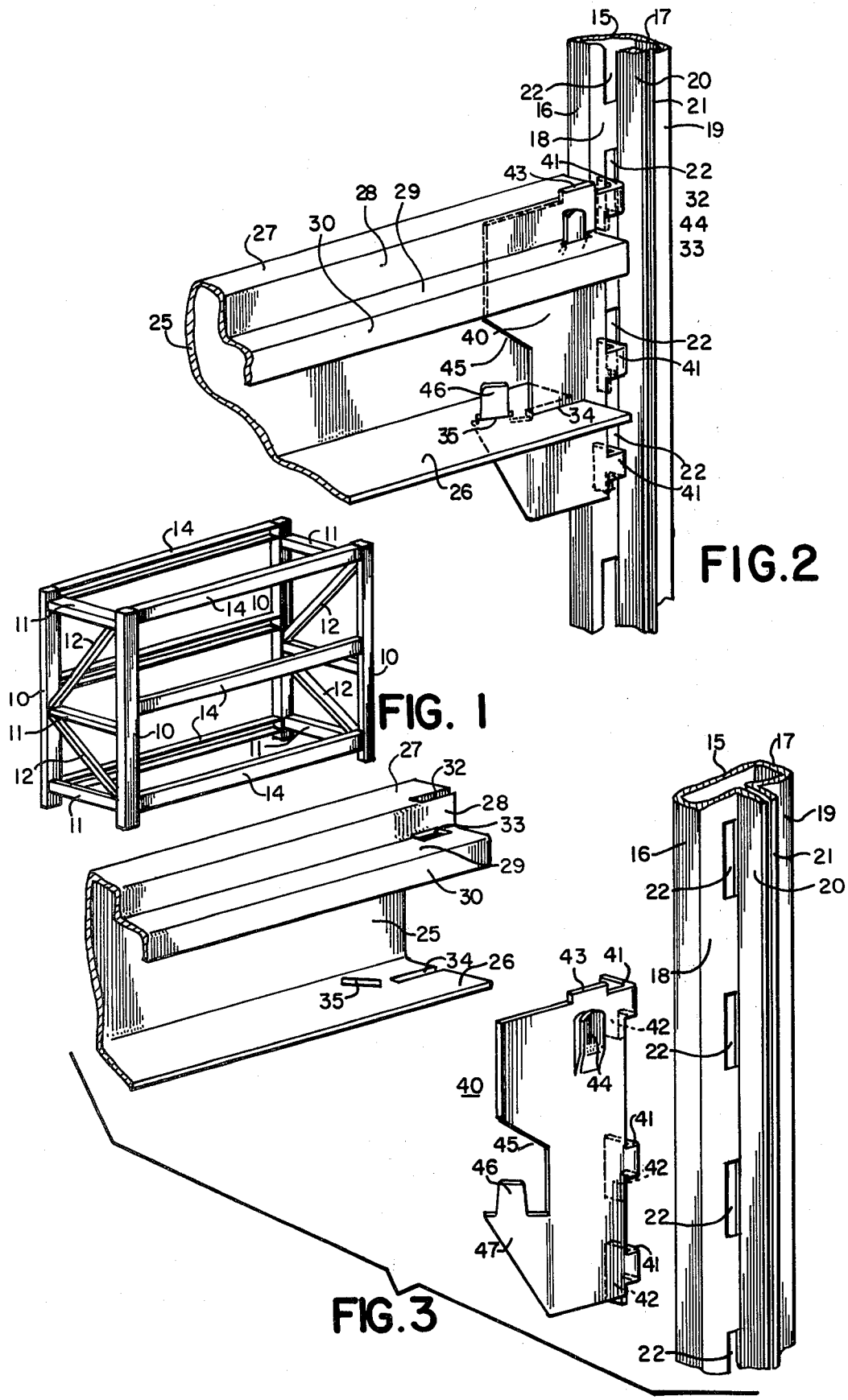

FASTENINGS FOR STORAGE RACKS

BACKGROUND OF THE INVENTION

1. Field of the Invention

This invention relates to fastenings for storage racks having upright columns or posts and horizontal crossbeams and which include gussets for locked engagement with the crossbeams and the posts.

2. Description of the Prior Art

It has heretofore been common practice to provide storage racks having upright columns or posts, connected in pairs with horizontal and diagonal braces parallel to the direction of access to provide rack ends, and with pairs of posts joined front and rear by horizontal crossbeams, the structure being factory welded or field bolted to maintain the rack in assembled condition.

Featherman et al., in U.S. Pat. No. 3,788,490 shows bracing members, upright posts of an erectable shelving rack or frame, and connectors engaging the posts and to which the bracing members are bolted.

Hasselqvist, in U.S. Pat. No. 4,069,638 shows conventional gusset type connectors 18 for joining horizontal beams to upright posts.

Wright, in U.S. Pat. No. 4,053,245, shows a separate connector for joining crossbeams to vertical posts but the structure employed differs in numerous respects from the structure of the present invention.

None of the prior art patents shows a simple but effective structure for locking horizontal crossbeams to upright posts.

SUMMARY OF THE INVENTION

In accordance with the invention a storage rack having vertical posts in connected pairs to make a rack end is provided with horizontal crossbeams connected by gussets to the vertical posts, the gussets having portions for locked engagement with the crossbeams and supported by the posts is provided which is simple to assemble and is rigid, which will carry the vertical loads for which it is designed, and which is resistant to bending moments.

It is the principal object of the invention to provide a free standing storage rack which is simple in construction, which may be quickly and easily assembled at the place of use, and which will be stable.

It is a further object of the invention to provide a storage rack which will be less expensive to make than the storage racks heretofore available.

It is a further object of the invention to provide a storage rack which permits of easy adjustment of storage level height without the necessity for employing special tools.

It is a further object of the invention to provide a storage rack which is accessible from either side.

It is a further object of the invention to provide a storage rack with a connection between the post and crossbeam which will resist vertical shear load as well as bending moments.

It is a further object of the invention to provide a storage rack with a simple but effective gusset in locked engagement with a horizontal crossbeam.

Other objects and advantageous features of the invention will be apparent from the description and claims.

BRIEF DESCRIPTION OF THE DRAWINGS

The nature and characteristic features of the invention will be more readily understood from the following description takin in connection with the accompanying drawings forming part hereof in which:

FIG. 1 is a view in perspective of a storage rack of the present invention;

FIG. 2 is a view in perspective showing the joining of the upright post and the horizontal crossbeam;

FIG. 3 is an exploded perspective view of the structure of FIG. 2;

Figure 4:
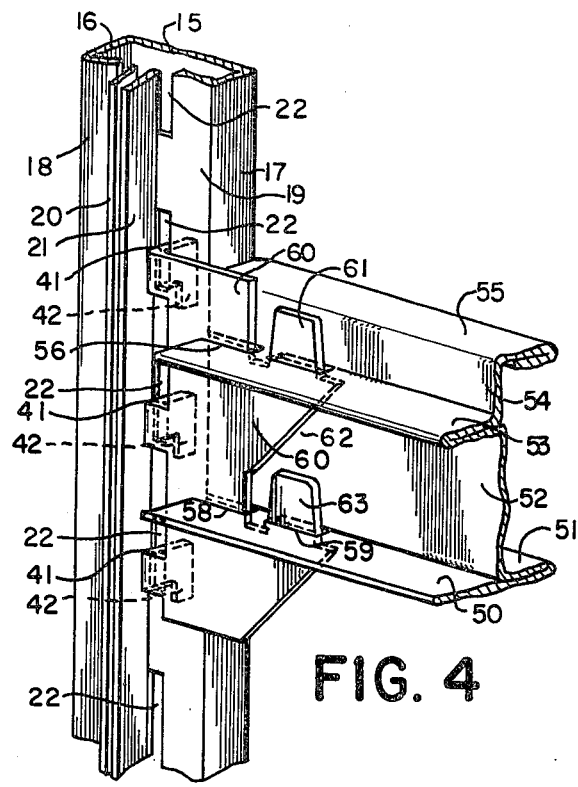
FIG. 4 shows a modified form of the invention employing a different crossbeam.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to FIG. 1 of the drawings the storage rack there shown comprises pairs of upright posts 10 having horizontal and diagonal braces 11 and 12 preferably welded to the upright supporting posts 10.

Interposed between the connected pairs of posts 10 horizontal crossbeams 14 are provided and secured at their ends as hereinafter explained.

Referring now more particularly to FIGS. 2 and 3 of the drawings the supporting post 10 is there shown with a crossbeam 14 mounted thereon.

The post 10 can be of a well known type of generally rectangular hollow sheet metal construction and of a length dependent on the height desired for the shelving.

The post 10 comprises an outside vertical wall 15, with parallel vertical end walls 16 and 17 extending therefrom and with vertical side walls 18 and 19 extending therefrom parallel to the wall 15, and having a pair of parallel spaced flanges 20 and 21 extending therefrom.

The walls 18 and 19 are provided with a plurality of spaced rectangular openings 22 preferably located along the flanges 20 and 21.

The horizontal crossbeams 14 can be of any suitable cross section and as illustrated in FIGS. 2 and 3 have an outside vertical wall 25 extending from end to end of the crossbeam 14, a bottom wall 26 extending horizontally from the bottom of the wall 25, a top wall 27 extending horizontally from the wall 25 with a vertically downwardly extending wall 28 extending from the wall 27, an inwardly extending horizontally wall 29 and a vertically downwardly extending wall 30.

The top wall 27, at each end, has a rectangular slot 32 extending along the interior of the wall 28 to the end thereof and the wall 29 has a rectangular slot 33 spaced inwardly from the end thereof and exteriorly of the wall 28.

The bottom wall 26 has a rectangular slot 34 extending inwardly from the end thereof parallel to the wall 25 and a rectangular slot 35 angularly disposed with respect to the slot 34.

A gusset or locking plate 40 is provided having a plurality of hooks 41 formed along one edge thereof with downwardly extending tabs 42 of a size for insertion into the openings 22, and lowering the plate 40 so that the tabs 42 retain the plate 40 in locking position with respect to the contiguous post 10.

The locking plate 40 has a rectangular locking tongue 43 for insertion from below and for engagement in the slot 32, and has a struck out tongue 44 for insertion from below in the slot 33 and for engagement with the outside face of the wall 28.

The locking plate 40 has a cut-away portion 45 to permit of engagement of the plate 40 in the slot 34 and an upwardly extending wedging tongue 46 carried on an angularly disposed portion 47 of the plate 40, and at the same angle as the slot 35 for insertion from below in the slot 35 with the plate 40 engaged in the slot 34. The wedging tongue 46 has an included taper angle which is substantially less than the coefficient of friction between engaging surfaces and for steel an angle of approximately 6 degrees is satisfactory.

Figure 5:
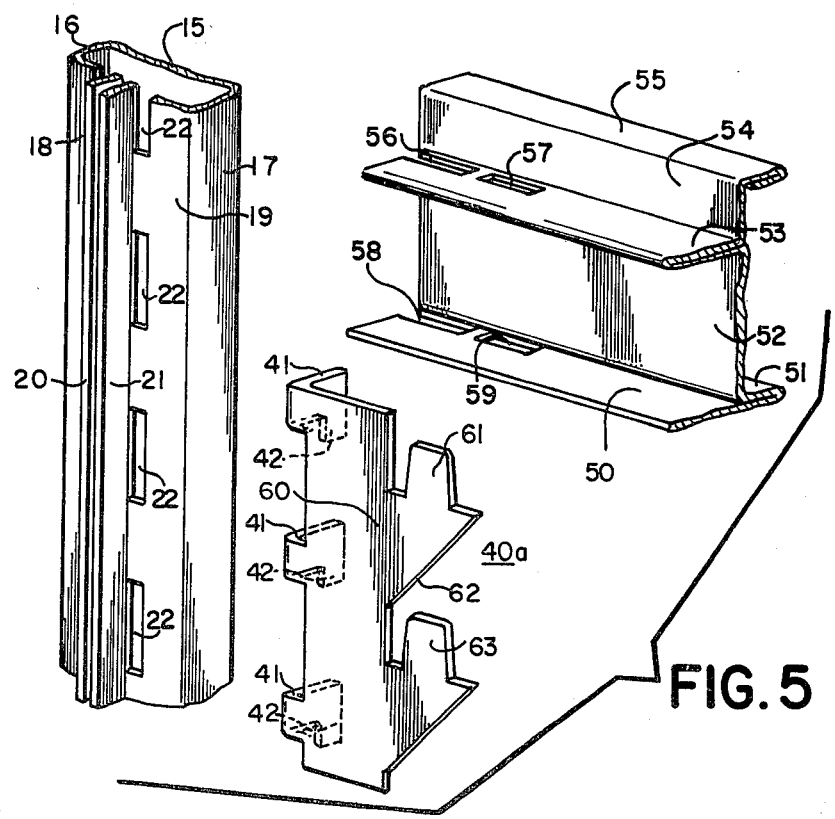
FIG. 5 is an exploded perspective view of the structure of FIG. 4.

In FIGS. 4 and 5 another preferred embodiment of the invention is illustrated.

The post 10 is the same as that previously described with an outside vertical wall 15, end walls 16 and 17, side walls 18 and 19, flanges 20 and 21 and rectangular openings 22.

A different form of crossbeam 14a of sheet metal is illustrated which has a bottom wall 50, a connector 51 to a vertical wall 52, a rib 53 with the sheet metal folded on itself, a vertical wall 54 and a horizontal top wall 55 with the sheet metal folded on itself. This cross-section of the crossbeam 14a provides improved bending load capacity over that of the crossbeam 14.

The crossbeam 14a at each end, has a rectangular slot 56 in the rib 53 extending along the wall 54 to the ends thereof and a rectangular slot 57 spaced from and aligned with the slot 56. The bottom wall 50, at each end, has a rectangular slot 58 extending along the wall 52 to the ends thereof and a rectangular slot 59 spaced from and aligned with the slot 58.

A gusset or locking plate 40a is provided having a plurality of hooks 41 formed along one edge thereof with downwardly extending tabs 42 of a size for insertion into the openings 22 and lowering of the plate 40a so that the tabs 42 retain the plate 40a in locked position with respect to the contiguous post 10.

The locking plate 40a has an upright portion 60 for reception and engagement in the slot 56 and a rectangular tapered tongue 61 for reception and engagement in the slot 57. The upright portion 60 is also in engagement in the slot 58. The plate 40a has a cutaway portion 62 and a rectangular tapered tongue 63 for reception and engagement in the slot 59.

The mode of assembly will now be pointed out. The locking plate 40 is raised from below to position the tongue 43, and the tongue 44 in the slots 32 and 33 while at the same time the plate 40 is engaged in the slot 34 and the tongue 46 is driven into wedged engagement in the slot 35. The hooks 41 are moved into the slots 22 and lowered so that the hooks are retained by the tabs 42.

The assembly of the locking plate 40a is similar to that previously described with the tongues 43 and 44 in the slots 32 and 33, and with the plate 40 in the slots 33 and 34 and the tongues 61 and 63 in wedged engagement in the slots 57 and 59.

It will be clear that additional cross beams 14 and 14a can be assembled with additional pairs of posts 10 braced by horizontal and diagonal braces 11 and 12.

I claim:
1. A storage rack comprising
upright posts rectangular in cross section and having outwardly extending vertical flanges and having vertically spaced slots,
a horizontal crossbeam member having portions with a plurality of horizontal upper and lower spaced slots, and
a unitary locking plate member having a plurality of downwardly extending hooks for engagement in the slots in the posts, and a plurality of tongues for engagement in the slots in the crossbeam member, at least one of the tongues being a wedging tongue.
2. A storage rack as defined in claim 1 in which
said posts are disposed in connected pairs connected by braces.
3. A storage rack as defined in claim 1 in which
said plate member has portions in engagement with upper and lower slots in the crossbeam member.
4. A storage rack comprising
upright posts having vertically spaced slots,
a crossbeam member having a plurality of horizontal upper and lower spaced slots, and
a locking plate member having a plurality of hooks for engagement in the slots in the posts, and a plurality of tongues for engagement in the slots in the crossbeam member,
said crossbeam member having a bottom wall with slots for the reception of said locking plate member and a tongue on said locking plate member, and
said crossbeam member having a portion spaced above said bottom wall with slots for the reception of said locking plate member and a tongue on said locking plate member.
5. A storage rack as defined in claim 4 in which
at least one of said tongues is in wedged relation in its slot.
6. A storage rack comprising
upright posts having vertically spaced slots,
a crossbeam member having a plurality of horizontal upper and lower spaced slots, and
a locking plate member having a plurality of hooks for engagement in the slots in the posts, and a plurality of tongues for engagement in the slots in the crossbeam member,
said locking plate member having a portion disposed at an angle with respect thereto and being provided with a tongue, and
one of said slots for the reception of said tongue is disposed at an angle with respect to others of said slots.
7. A storage rack comprising
upright posts having vertically spaced slots,
a crossbeam member having a plurality of horizontal upper and lower spaced slots, and
a locking plate member having a plurality of hooks for engagement in the slots in the posts, and a plurality of tongues for engagement in the slots in the crossbeam member,
said crossbeam having a bottom wall with slots for the reception of said locking plate member and a tongue on said locking plate member, and
said crossbeam member having a rib parallel to and spaced above said bottom wall with slots for the reception of the hooks of said locking plate member and one of the tongues on said locking plate member.
8. A storage rack as defined in claim 7 in which
said crossbeam member has a top wall spaced above said rib.

* * * * *